United States Patent [19]

Watanabe et al.

[11] Patent Number: 4,596,047

[45] Date of Patent: Jun. 17, 1986

[54] SATELLITE BROADCASTING RECEIVER INCLUDING A PARABOLIC ANTENNA WITH A FEED WAVEGUIDE HAVING A MICROSTRIP DOWN CONVERTER CIRCUIT

[75] Inventors: Hiroshi Watanabe; Eiji Aoki, both of Tokyo, Japan

[73] Assignee: Nippon Electric Co., Ltd., Tokyo, Japan

[21] Appl. No.: 411,786

[22] Filed: Aug. 26, 1982

[30] Foreign Application Priority Data

Aug. 31, 1981 [JP] Japan ................................ 56/136441
Sep. 29, 1981 [JP] Japan ................................ 56/154363

[51] Int. Cl.$^4$ ................................................ H04B 1/18

[52] U.S. Cl. .................................... 455/281; 455/328; 455/327; 343/840; 333/21 A; 333/21 R; 333/248; 333/26

[58] Field of Search ............... 343/840, 786, 781, 775, 343/756, 361, 363, 365; 333/21 R, 21 A, 26, 247, 238, 239, 208, 248; 455/323, 325, 327, 328, 280–282

[56] References Cited

U.S. PATENT DOCUMENTS

| | | | |
|---|---|---|---|
| 2,691,731 | 10/1954 | Miller | 343/756 |
| 3,201,717 | 8/1965 | Grosbois et al. | 343/756 |
| 3,732,508 | 5/1973 | Ito et al. | 333/21 R |
| 3,832,717 | 8/1974 | Taggart, Jr. | 343/840 |
| 3,882,396 | 5/1975 | Schneider | 333/21 R X |
| 4,060,779 | 11/1977 | Atia et al. | 333/21 A |

FOREIGN PATENT DOCUMENTS

| | | | |
|---|---|---|---|
| 0055150 | 5/1979 | Japan | 333/26 |
| 718828 | 11/1954 | United Kingdom | 343/756 |

*Primary Examiner*—Eugene R. LaRoche
*Assistant Examiner*—Benny T. Lee
*Attorney, Agent, or Firm*—Sughrue, Mion, Zinn, Macpeak, and Seas

[57] ABSTRACT

A compact satellite broadcasting receiver comprises a circular waveguide, a strip-line-shaped probe projected into the circular waveguide, a reflecting element provided downstream of the probe in the circular waveguide and a microwave circuit having a strip line provided around the circular waveguide and connected with the probe. Furthermore, a satellite broadcasting receiver capable of simultaneously receiving two kind of microwaves polarized perpendicularly to each other is realized by joining two compact satellite broadcasting receivers as mentioned above with their strip-line-shaped probes placed at a right angle.

13 Claims, 25 Drawing Figures

SATELLITE BROADCASTING RECEIVER INCLUDING A PARABOLIC ANTENNA WITH A FEED WAVEGUIDE HAVING A MICROSTRIP DOWN CONVERTER CIRCUIT

BACKGROUND OF THE INVENTION

The present invention relates to a satellite broadcasting receiver, particularly to an antenna arrangement comprising a frequency down converter for converting an electromagnetic wave received by a parabolic antenna to a signal having a lower frequency.

A satellite broadcasting receiver is used for receiving an electromagnetic wave transmitted by a satellite positioned on a stationary orbit in the sky, and generally comprises a parabolic antenna, a waveguide situated at a focus of the parabolic antenna, a frequency down converter having a strip line, and a mode converter provided between the waveguide and the strip line of the freqeuncy down converter for converting a waveguide mode ($TE_{01}$ mode) to a strip line mode (TEM mode). An output of the frequency converter is applied to a domestic television receiver through a FM-AM converter or a demodulator.

In a conventional satellite broadcasting receiver, the electromagnetic wave is guided to the outside of the parabolic antenna though the waveguide where the mode converter and the frequency down converter are provided, or the waveguide, the mode converter and the frequency down converter are unified in one body and provided at the focus of the parabolic antenna. However, in this conventional receiver, the mode conversion is processed sequentially from the waveguide mode to the strip line mode through the coaxial cable mode, and the configuration becomes excessively complex. On the other hand, a mode converter for directly converting the rectangular waveguide mode to the strip line mode is also employed. However, in a situation where a mode converter of this kind is employed, two waves of different polarizations cannot be received without the rotation of the whole antenna. Moreover, when the receiver is arranged for simultaneously receiving these two kinds of differently polarized waves, it is necessary that these two kinds of polarized waves should be derived respectively from different positions of the waveguide provided at the focus of the parabolic antenna, resulting in the additional disadvantage that the effective area of the parabolic antenna is reduced.

SUMMARY OF THE INVENTION

An object of the present invention is to provide a satellite broadcasting receiver in which an electromagnetic wave received by a parabolic antenna can be extremely simply converted into the strip line mode and wherein a frequency down converter circuit can be arranged around a waveguide.

Another object of the present invention is to provide a satellite broadcasting receiver in which two kinds of differently polarized waves can be received without reducing the effective area of a parabolic antenna by serially arranging two frequency down converter circuits in a direction of an axis of a waveguide provided at the focus of a parabolic antenna.

A still further object of the present invention is to provide a mode converter for effecting the mode conversion between a circular waveguide mode and a strip line mode which makes possible the realization of a remarkably small sized satellite broadcasting receiver.

According to the present invention, there is provided a satellite broadcasting receiver comprising a parabolic antenna, a waveguide for guiding two kinds of differently polarized waves which is provided at a focus of the parabolic antenna, a strip line inserted into the waveguide along a polarization direction thereof as a probe, a frequency down converter circuit arranged on the same plane with the strip line and around the waveguide, and a reflecting element for reflecting a wave polarized in parallel with the strip line which element is arranged in the waveguide downstream of the strip line.

Another feature of the present invention is that it is possible to obtain a satellite broadcasting receiver constructed as mentioned above in which the reflecting element is arranged such that a wave polarized perpendicularly to the strip line can be passed therethrough and which further comprises another strip line inserted into the waveguide perpendicular to the aforesaid strip line and downstream of the reflecting element, another converter circuit arranged around the waveguide on the same plane with the other strip line, and another reflecting element provided in the waveguide downstream of the other strip line for reflecting a wave polarized in parallel therewith, so as to simultaneously receive two kinds of waves polarized perpendicularly to each other.

BRIEF DESCRIPTION OF THE DRAWINGS

For a better understanding of the invention, reference is made to the accompanying drawings, in which:

FIG. 4(*b*) is a perspective view showing an outline of a conventional mode converter for effecting the mode conversion between a circular waveguide mode and a strip line mode;

FIG. 5(*b*) is a side view showing an outline of another embodiment of the present invention in which two kinds of waves polarized perpendicularly to each other can be simultaneously received;

FIG. 15(*b*) is a circuit diagram showing an equivalent circuit in a Y direction of the reflecting element as shown in FIG. 15(*a*);

FIG. 15(*c*) is a circuit diagram showing an equivalent circuit in an X direction of the reflecting element as shown in FIG. 15(*a*);

DESCRIPTION OF THE PREFERRED EMBODIMENTS

Firstly, for a better understanding of the invention, an outline of a satellite broadcasting receiver and conventional techniques employed therefor will be explained.

Figure 1:
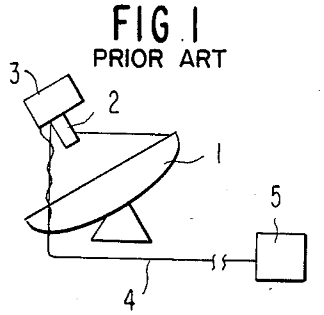
FIG. 1 PRIOR ART
FIG. 1 is a diagram showing an outline of a satellite broadcasting receiver.

FIG. 1 shows an outline of a satellite broadcasting receiver in which a waveguide accompanying a frequency down converter is provided at the focus of a parabolic antenna. In FIG. 1, a horn 2 receives a microwave signal caught by a parabolic antenna 1. The microwave signal received by the horn 2 is supplied to a frequency down converter 3, coupled with a waveguide which is conected with the horn 2, and is converted into a lower frequency signal therein. The output of the frequency down converter 3 is applied to a demodulator or a FM-AM converter 5 provided apart therefrom through a coaxial cable 4. Moreover, a dc power is also supplied from the demodulator 5 to the frequency down converter 3 through the coaxial cable 4. In the frequency down converter 3 as shown in FIG. 1, a mode conversion is effected for transmitting the microwave signal supplied through the waveguide to a frequency down converter circuit containing a strip line. This mode conversion is carried out from the waveguide mode to the strip line mode either through the coaxial mode or directly from the waveguide mode to the strip line mode.

Figure 2:
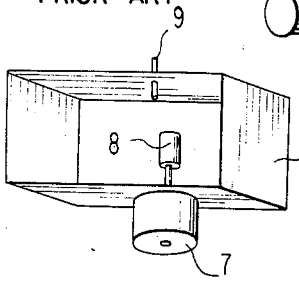
FIG. 2 PRIOR ART
FIG. 2 is a perspective view showing a mode converter for effecting the mode conversion between a rectangular waveguide mode and a coaxial mode.

FIG. 2 shows a conventional mode converter for carrying out the mode conversion from the waveguide mode to a coaxial mode which is equivalent to the strip line mode. In this mode converter, a coaxial cable 7 is connected to a lower wall of a rectangular waveguide 6, in which a coupling probe 8 extended from an inner conductor of the coaxial cable 7 is provided. In this mode converter, an adjusting stub 9 extended from an upper wall of the waveguide 6 is also provided as occasion demands.

Figure 3:
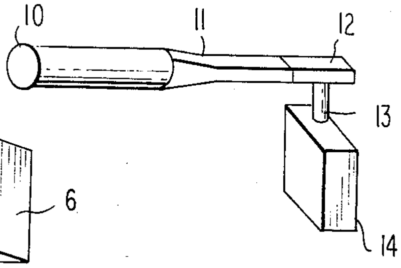
FIG. 3 PRIOR ART
FIG. 3 is a perspective view showing an example of a conventional satellite broadcasting receiver comprising a circular waveguide at a focus of parabolic antenna, a mode converter for effecting the mode conversion between a rectangular waveguide mode and a coaxial mode and a frequency down converter containing a strip line.

FIG. 3 shows an example of a frequency down converter which is unified with a waveguide provided close to the focus of a parabolic antenna. In this converter, a microwave signal caught by the parabolic antenna is firstly received by a circular horn 10, and is then supplied to a rectangular waveguide 12 through a mode converter 11 between a circular waveguide connected to the circular horn 10 and the rectangular waveguide 12. In this rectangular waveguide 12, the waveguide mode is converted into the coaxial mode through the mode converter as shown in FIG. 2. Thereafter, the microwave signal is applied through a coaxial cable 13 to a frequency down converter 14 containing a strip line.

Figure 4A:
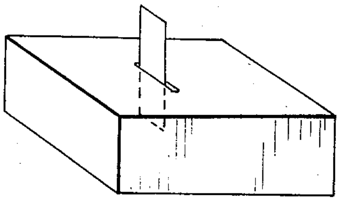
PRIOR ART FIG. 4(a)
FIG. 4(*a*) is a perspective view showing an outline of a conventional mode converter for effecting the mode conversion between a rectangular waveguide mode and a strip line mode.
Figure 4B:
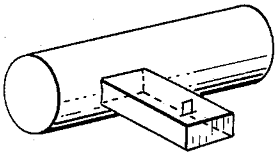
PRIOR ART FIG. 4(b)

On the other hand, for carrying out the mode conversion directly from the waveguide mode to the strip line mode, mode converters as shown in FIGS. 4(*a*) and 4(*b*) are usually employed. However, in a situation where the above mentioned conventional mode conversions are applied for the satellite broadcasting receiver used for receiving two kinds of waves polarized perpendicularly to each other, the aforesaid problems are caused. That is, it is difficult to receive those two kinds of waves polarized perpendicularly to each other through the converter as shown in FIG. 4(*a*) without the rotation of the whole antenna, while in FIG. 4(*b*), the frequency converter circuit and the mode converter occupy a large space around the waveguide and, as a result, the effective area of the parabolic antenna is reduced.

Figure 5A:
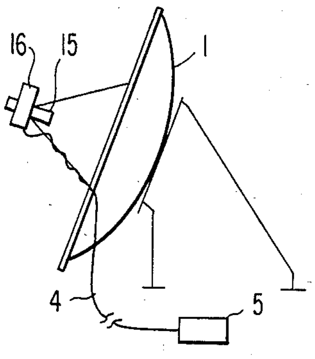
FIG. 5(*a*) is a side view showing an outline of an embodiment of the present invention.
Figure 5B:
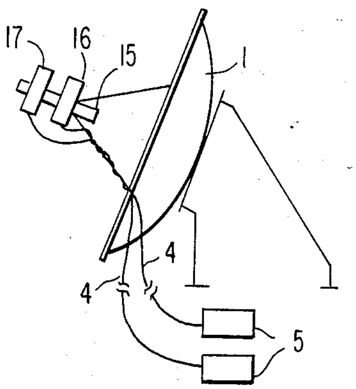

FIG. 5(*a*) schematically shows an outline of an embodiment of the present invention. In FIG. 5(*a*), a circular horn 15 for receiving a microwave signal is provided at the focus of the parabolic antenna 1 and a frequency down converter circuit 16 is arranged around a waveguide extended from the circular horn 15, so as to prevent the reduction of the effective area of the parabolic antenna 1. In this figure, the output of the converter circuit is transmitted to a demodulator 5 through a coaxial cable 4.

FIG. 5(*b*) shows another embodiment of the present invention, in which two kinds of waves polarized perpendicularly to each other are received simultaneously. In this embodiment, it is only necessary to add another converter circuit 17 arranged around the circular waveguide to the configuration. shown in FIG. 5(*a*), so that those two kinds of waves polarized perpendicularly to each other can be simultaneously received without the reduction of the effective area of the parabolic antenna 1. In FIG. 5(*b*), furthermore, the output derived from the converter circuit 17 is transmitted to another demodulator 5′ through another coaxial cable 4′.

Figure 6:
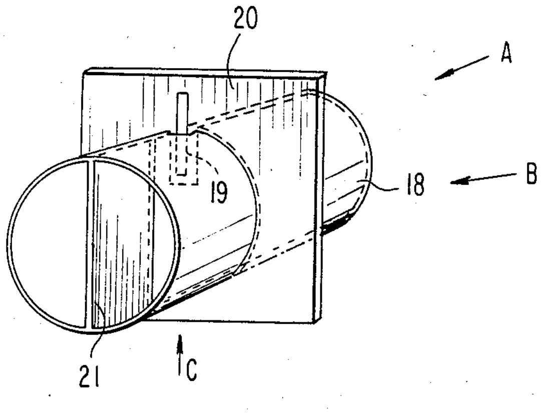
FIG. 6 is a perspective view showing a mode converter for effecting the mode conversion between a circular waveguide mode and a strip line mode according to the present invention.

Next, a mode converter connected between the circular waveguide and the strip line, which is employed for the embodiments shown in FIGS. 5(*a*) and 5(*b*) and in which the frequency down converter circuit or other circuits can be easily and effectively arranged around the circular waveguide, will be explained by referring to FIG. 6. In FIG. 6, a strip line 19 is projected into a circular waveguide 18 which is connected to the horn 15 shown in FIG. 5(*a*) so as to function as a probe. This strip line 19 is formed or mounted on a circuit board 20 which is arranged around the circular waveguide 18 and on which the frequency down converter circuit corresponding to the block 16 as shown in FIG. 5(*a*) is assembled, and the stripline 19 is coupled with the wave polarized in the vertical direction in FIG. 6, that is, the V-wave among the waves guided through the circular waveguide 18. In addition, a metal plate 21 functioning as a reflecting element against the V-wave is provided downstream of the probe 19. The output of the frequency down converter circuit 16 mounted on the circuit board 20 is transmitted to the demodulator 5 through the coaxial cable 4 as shown in FIG. 5(*a*).

Figure 7A:
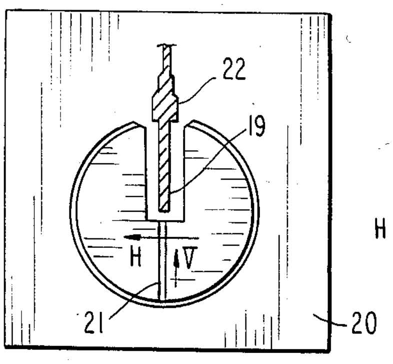
FIGS. 7(*a*), 7(*b*) and 7(*c*) are a front view, a side view and a plan view of the mode converter as shown in FIG. 6, respectively.
Figure 7B:
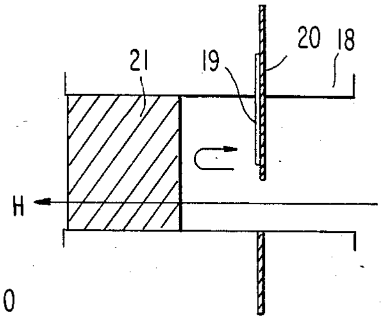
Figure 7C:
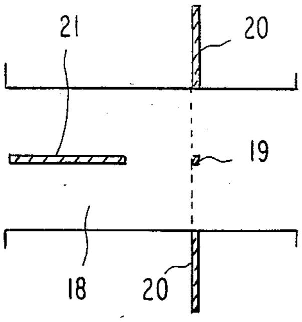

FIGS. 7(*a*), 7(*b*) and 7(*c*) show the configuration of the mode converter respectively in the directions A, B and C as shown in FIG. 6. In the mode converter as shown in FIG. 6, a length of the probe 19 is selected to be about one fourth of the wavelength, that is, $\lambda/4$, in accordance with the frequency of the desired microwave signal, similarly a distance from the probe 19 to the plate 21 is selected also to be about $\lambda/4$. Further, a length of the plate 21 functioning as the reflecting element is selected to be about $\lambda/2$. Further, it is preferable to form a matching section 22 between the probe 19 and the strip line (input of the frequency down converter circuit) as shown in FIG. 7(*a*).

Referring to FIG. 7(*b*), the incoming V-wave is absorbed by the probe 19 and further reflected by the plate 21 so as to be more effectively absorbed by the probe 19. On the other hand, the other wave polarized perpendicularly to the V-wave, that is, the H-wave, is not absorbed by the probe 19 and is passed downstream, because it is perpendicular to both crosses the probe 19 and the plate 21.

Figure 8A:
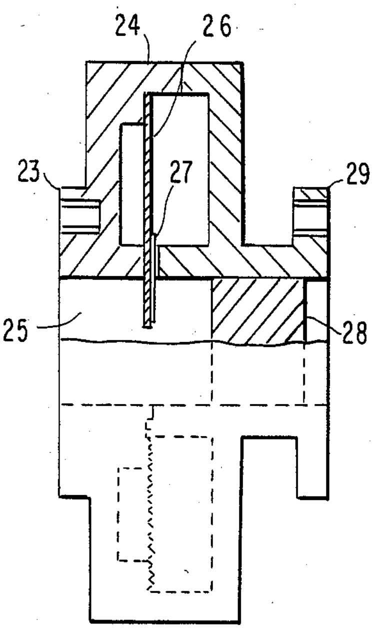
FIGS. 8(*a*) and 8(*b*) are a side cross-section view and an elevation showing a three-dimensional structure of a frequency converter employing the mode converter as shown in FIG. 6, respectively.
Figure 8B:
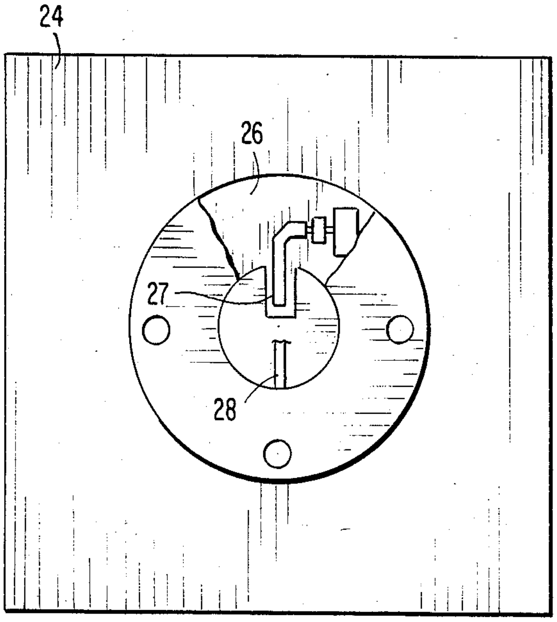

FIGS. 8(*a*) and 8(*b*) show the concrete structure of a frequency down converter according to the present invention which includes the mode converter as shown in FIG. 6. That is, FIGS. 8(*a*) and 8(*b*) are a side cross-section view and an elevation view thereof, respectively. The circular horn 15 positioned at the focus of the parabolic antenna 1 (FIG. 5(*a*)) is connected with a circular waveguide 25 through a flange 23. The circular waveguide 25 is protruded through a center of a converter body 24. A probe 27 mounted on a circuit board 26 is projected into the circular waveguide 25. In this circular waveguide 25, a metal plate 28 functioning as a reflecting element is provided downstream of the probe 27.

Figure 9:
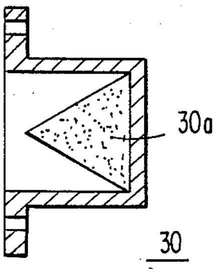
FIG. 9 is a cross-section view showing a dummy load termination mounted at an end of the frequency converter as shown in FIGS. 8(*a*) and 8(*b*)
Figure 10:
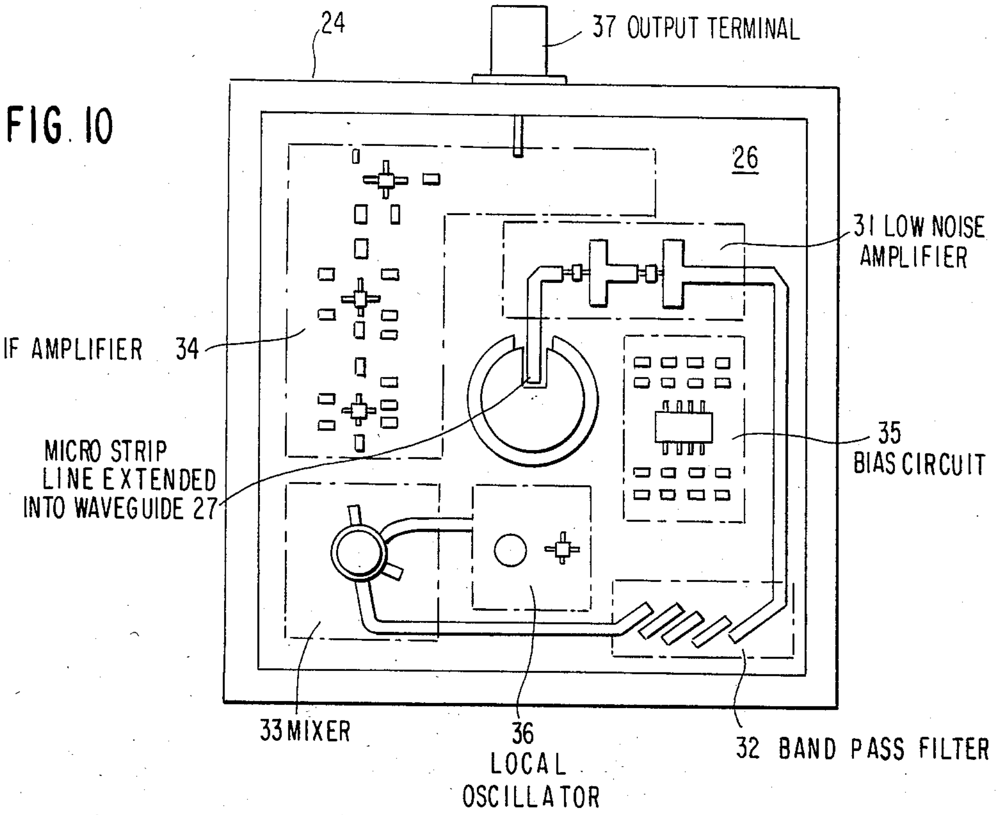
FIG. 10 is a diagram showing an outline of an arrangement of a printed circuit board and circuit elements forming the converter circuit containing the probe as shown in FIGS. 8(*a*) and 8(*b*)

In the case where a single polarization wave is to be received, a dummy load termination 30 as shown in FIG. 9 is fitted onto a flange 29 provided at the other end of the circular waveguide 25. This dummy load termination 30 is formed of a waveabsorber 30*a* mounted on the termination of the dummy 30. FIG. 10 shows an outline of an example of a converter circuit arranged on the board 26. In FIG. 10, the microwave signal absorbed by the probe 27 is frequency down-converted and derived from an output terminal 37 through a low noise amplifier 31, a bandpass filter 32, a mixer 33 and an IF amplifier 34, successively. On the circuit board 26, a bias circuit 35 for the low noise amplifier 31 and a local oscillator 36 are further arranged.

Figure 11:
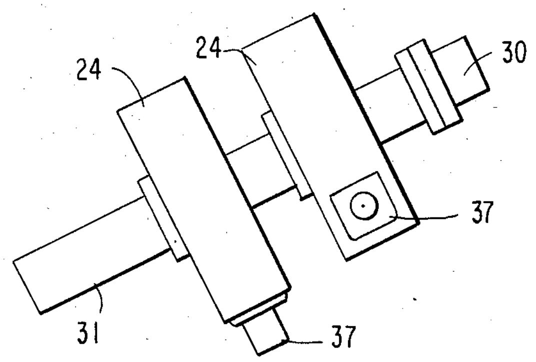
FIG. 11 is a plan view showing a series connection of two converters provided for simultaneously receiving two kinds of waves polarized perpendicularly to each other.
Figure 12:
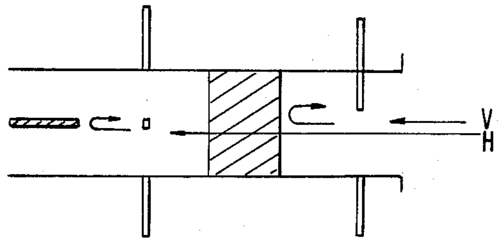
FIG. 12 is a cross-section view showing an arrangement of a mode converter provided between a circular waveguide and a strip line for simultaneously receiving two kinds of waves polarized perpendicularly to each other.

In the satellite broadcasting receiver according to the present invention, any one of two kinds of waves polarized perpendicularly with respect to each other can be easily received only by rotating by 90 degrees the arrangement of the frequency down converter coupled with the circular waveguide provided close to the focus of the parabolic antenna. Moreover, in the situation where another frequency down converter is fitted onto the flange 29 shown in FIG. 8(*a*) with an angle difference of 90 degrees, two kinds of waves polarized perpendicularly to each other can be simultaneously received. FIG. 11 shows an example in which two frequency down converters are coupled with a circular horn 31 in series with each other as mentioned above, while FIG. 12 shows the manner by which respective probes of those two frequency down converters are coupled with the V-wave and the H-wave, respectively.

Regarding the above-mentioned embodiments, only the converter circuit is arranged on the circuit board on which the probe is mounted. However, is of course possible to further provide a demodulator circuit or other circuits on the same board.

Figure 13:
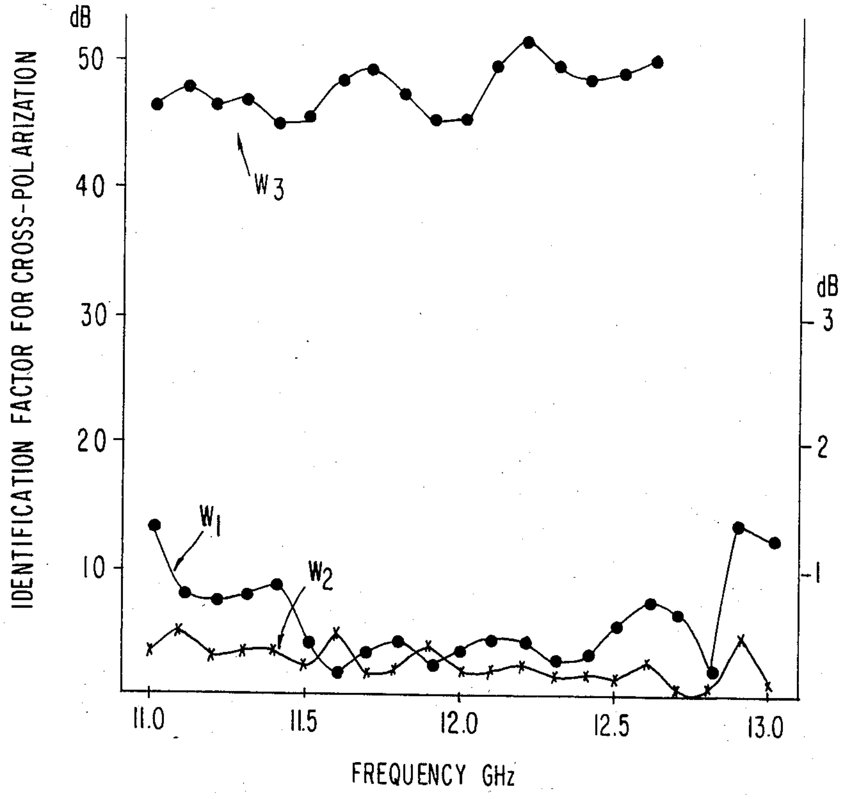
FIG. 13 is a diagram showing characteristic curves of performances of the mode converter provided between the circular waveguide and the strip line as shown in FIG. 6.

FIG. 13 shows various characteristics of the mode converter between the circular waveguide and the strip line as shown in FIG. 6. In FIG. 13, the curve $\omega_1$ indicates the matching loss of the probe with regard to the parallel polarized wave, that is, the V-wave absorbed into the probe 19 in parallel as shown in FIG. 6. The curve $\omega_2$ indicates the insertion loss with regard to the perpendicularly polarized wave, that is, the H-wave perpendicular to the V-wave and, in other words, the loss of the H-wave during its passing through the mode converter as shown in FIG. 6. The curve $\omega_3$ indicates the identification factor for the cross polarization, that is, the ratio of the amount absorbed into the probe 19 between the V-wave and the H-wave as shown in FIG. 6. As indicated by the curves shown in FIG. 13, in the mode converter as shown in FIG. 6, the parallel polarized wave can be converted from the waveguide mode to the strip line mode with an extremely low loss, while the perpendicularly polarized wave can be passed with an extremely low loss. Thus, this mode converter not only has excellent physical characteristics as mentioned above, but also exhibits a high identification factor for cross polarized waves.

Figure 14:
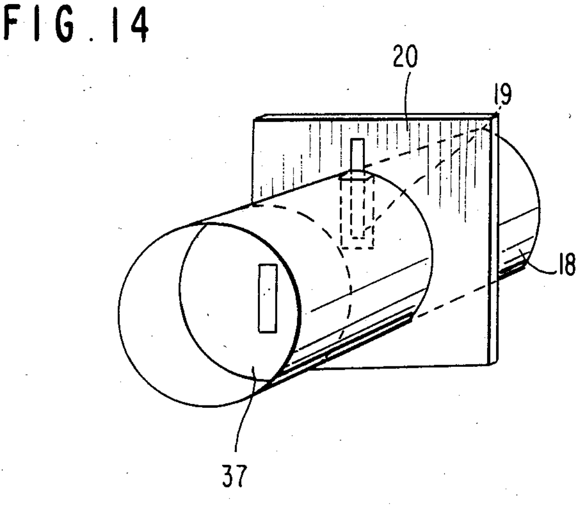
FIG. 14 is a perspective view showing another example of the mode converter provided between the circular waveguide and the strip line, which can be employed for an embodiment of the present invention.

The above exemplifed mode converter for effecting the mode conversion from the waveguide mode to the strip line mode according to the present invention is provided with a waveguide in which the probe is inserted, and a metal plate functioning as a reflecting element is arranged downstream of the probe in parallel therewith. However, it is possible to employ a resonating window (an iris filter) as the reflecting element in place of the above mentioned metal plate. FIG. 14 shows an example of the mode converter employing the iris filter 37, and it is otherwise arranged just the same as that shown in FIG. 6. In the mode converter as shown in FIG. 14 also, the V-wave is coupled the probe 19, while the H-wave is passed through the iris filter 37.

Figure 15A:
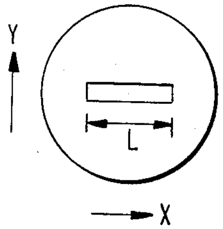
FIG. 15(*a*) is a diagram showing a reflecting element used for the mode converter as shown in FIG. 14.
Figure 15B:
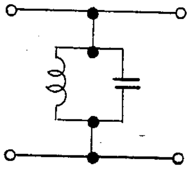
Figure 15C:
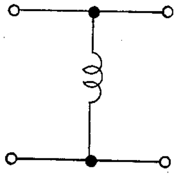

Next, by referring to FIGS. 15(*a*), 15(*b*) and 15(*c*), the above mentioned iris filter 37 will be explained. Concerning the slit of the iris filter as shown in FIG. 15(*a*), the equivalent circuit thereof for the wave polarized in parallel with the short axis thereof, that is, in the Y direction, is formed as shown in FIG. 15(*b*). When the length L of the long axis of the slit is selected to about $\lambda/2$ of the intended microwave signal, the resonant frequency of the iris filter can be matched to the frequency of the intended microwave signal, so that the wave polarized in the Y direction can be passed through this iris filter.

In contrast therewith, the equivalent circuit thereof for the wave polarized in the X direction shown in FIG. 15(*a*) is formed as shown in FIG. 15(*c*), so that the iris filter is operated as a reactance having a large susceptance, and, as a result, the wave polarized in the X direction is reflected by the iris filter. Accordingly, it cannot pass through the iris filter.

Consequently, in the mode converter as shown in FIG. 14, the injected V-wave is absorbed by the probe 19 and further reflected by the iris filter 37, so as to be more effectively absorbed by the probe 19, while the injected H-wave is not absorbed by the probe 19 because of its polarization perpendicular to the slot, and it is therefore passed through the iris filter 37.

Figure 16:
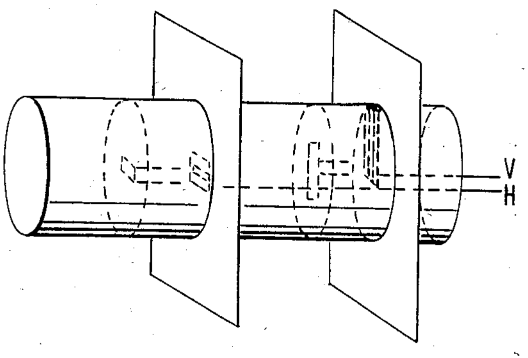
FIG. 16 is a perspective view showing an arrangement provided for simultaneously receiving two kinds of waves polarized perpendicularly to each other.

As mentioned above, an effective satellite broadcasting receiver can also be obtained by employing the mode converter containing the iris filter. Furthermore, a satellite broadcasting receiver which can simultaneously receive two kinds of waves polarized perpendicularly to each other can be realized by joining two mode converters in series with each other, so as to form two stages with an angle difference of 90 degrees. FIG. 16 shows an outline of the arrangement of two circuit boards and two mode converters connected in series with each other.

Figure 17A:
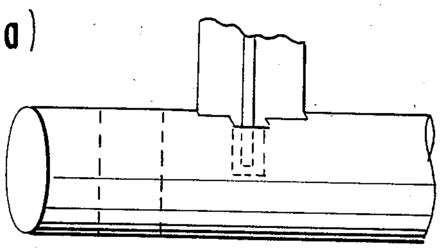
FIGS. 17(*a*) and 17(*b*) are perspective views showing another arrangement of the strip line inserted into the circular waveguide in the mode converter as shown in FIGS. 6 and 14.
Figure 17B:
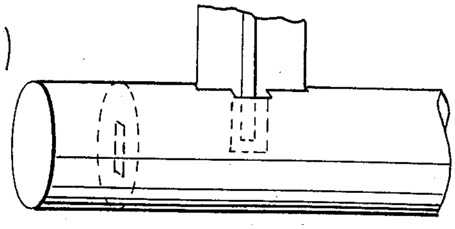

In the above mentioned examples of the mode converter according to the present invention, the direction of the insertion of the probe into the circular waveguide is selected such that the plane of the strip line (probe) crosses the direction of the axis of the circular waveguide. However, as shown in FIGS. 17(*a*) and 17(*b*), it is possible to insert the probe such that the plane of the strip line is parallel with the axial direction of the circular waveguide. Furthermore, according to the present invention, a regular square waveguide can be employed as the waveguide through which two kinds of waves polarized perpendicularly to each other can be guided.

What is claimed is:

1. A satellite broadcasting receiver comprising a parabolic antenna having a focus, a circular waveguide provided close to said focus of said parabolic antenna for receiving an electromagnetic wave caught by said parabolic antenna, a microwave circuit for processing the received electromagnetic wave, said microwave circuit having a strip line and being disposed on a printed circuit board having an aperture therein through which said circular waveguide passes, and a mode converter between said circular waveguide and said strip line, said mode converter including a strip-line-shaped probe connected to said strip-line of said microwave circuit and projecting into said circular waveguide within said aperture and a reflecting element provided in said waveguide downstream of said probe.

2. The satellite broadcasting receiver as claimed in claim 1, wherein said reflecting element is formed of a metal plate provided in said circular waveguide and lying in a plane parallel with both the projectional direction of said probe and the axial direction of said circular waveguide.

3. A microwave equipment comprising a circular waveguide, a strip-line-shaped probe projected into said circular waveguide, a reflecting element provided downstream of said probe in said circular waveguide and a microwave circuit having a strip line connected with said probe, wherein said microwave circuit is disposed on a printed circuit board having an aperture therein, and said circular waveguide passes through said aperture.

4. The microwave equipment as claimed in claim 3, wherein said reflecting element is formed of a metal plate provided in said circular waveguide and lying in a plane parallel with both said probe and an axial direction of said circular waveguide.

5. A satellite broadcasting receiver comprising two units and a parabolic antenna, wherein:

each of said two units contains a printed circuit board having an aperture therein, a circular waveguide passing through said aperture, a strip-line microwave circuit disposed on said printed circuit board, a strip-line-shaped probe connected to said microwave circuit and projecting into said circular waveguide, and a reflecting element provided downstream of said probe in said circular waveguide;

said two units are coupled to said antenna and connected with their waveguides in series and such that their respective probes are displaced by an angle of 90 degrees relative to one another around the circumference of the circular waveguides; and the circular waveguides of said two units receive two kinds of microwave signals polarized perpendicularly to each other caught by said parabolic antenna.

6. A satellite broadcasting receiver comprising a parabolic antenna having a focus, a circular waveguide provided close to said focus of said parabolic antenna for receiving an electromagnetic wave caught by said parabolic antenna, a microwave circuit for processing the received electromagnetic wave, said microwave circuit having a strip-line and being disposed on a printed circuit board having an aperture therein through which said circular wave guide passes, and a mode converter between said circular waveguide and said stripline, said mode converter including a strip-line-shaped probe connected to said microwave circuit strip-line and projected into said circular waveguide within said aperture and a reflecting element provided in said waveguide downstream of said probe, said reflecting element comprising an iris filter with an iris having a longitudinal direction parallel with the projectional direction of said probe.

7. A microwave equipment comprising a printed circuit board having an aperture therein, a circular waveguide passing through said aperture, a microwave circuit disposed on said printed circuit board around said aperture and having a strip-line, a strip-line-shaped probe connected to said stripline and projected into said circular waveguide within said aperture, a reflecting element provided downstream of said probe in said circular waveguide, said reflecting element comprising an iris filter having an iris with a longitudinal direction parallel with said probe.

8. A satellite broadcasting receiver comprising:

a printed circuit board having an aperture therein, a parabolic antenna having a focus, a waveguide provided close to said focus of said parabolic antenna for receiving a microwave signal caught by said parabolic antenna, said waveguide being capable of receiving two kinds of microwave signals polarized perpendicularly to each other, a microwave circuit for processing the received microwave signal, said microwave circuit having a strip-line and being disposed on said printed circuit board around said aperture, a mode converter including a stripline-shaped probe connected to said stripline and projected into said waveguide parallel to one of said perpendicularly polarized microwave signals and a reflecting element provided downstream of said probe within said waveguide.

9. A microwave equipment comprising two units, wherein:

each of said two units contains a printed circuit board having an aperture therein, a circular waveguide passing through said aperture and capable of receiving two kinds of microwave signals polarized perpendicularly to each other, a strip-line microwave circuit disposed on said printed circuit board, a strip-line-shaped probe connected to said microwave circuit and projecting into said waveguide within said aperture in a direction parallel to a respective one of said perpendicularly polarized microwave signals, and a reflecting element provided downstream of said probe in said waveguide; and said two units are joined with each other such that the strip-line-shaped probes of said two units are displaced by 90 degrees relative to one another.

10. A microwave equipment comprising a printed circuit board having an aperture therein, a waveguide passing through said aperture and capable of receiving two kinds of microwave signals polarized perpendicularly to each other, a microwave circuit disposed on said printed circuit board around said aperture and having a stripline, a strip-line-shaped probe connected to said stripline and projected into said waveguide within said aperture in a direction parallel to a respective one of said perpendicularly polarized microwave signals, and a reflecting element provided downstream of said probe in said waveguide.

11. A satellite broadcasting receiver comprising two units and a parabolic antenna, wherein:

each of said two units contains a printed circuit board having an aperture therein, a waveguide passing through said aperture and capable of receiving two kinds of microwave signals caught by said antenna and polarized perpendicularly to each other, a strip-line microwave circuit disposed on said printed circuit board, a strip-line-shaped probe connected to said microwave circuit and projecting into said waveguide within said aperture in a direction parallel to a respective one of said perpendicularly polarized signals, and a reflecting element provided downstream of said probe in said waveguide; and said two units are coupled to said antenna for receiving said microwave signals and are connected in series with each other such that their waveguides are displaced by 90 degrees relative to one another with respect to an axis of the waveguides.

12. A microwave equipment comprising two units, wherein:

each of said two units contains a printed circuit board having an aperture therein, a circular waveguide passing through said aperture, a strip-line microwave circuit disposed on said printed circuit board, a strip-line-shaped probe connected to said microwave circuit and projecting into said circular waveguide, and a reflecting element provided downstream of said probe in said circular waveguide;

said two units are joined with each other such that the strip-line-shaped probes in each of the circular waveguides are displaced around the circumference of said circular waveguides by an angle of 90 degrees relative to one another; and the circular waveguides of said two units are adapted to receive two kinds of microwave signals polarized perpendicularly to each other.

13. The microwave equipment as claimed in claim 12, wherein each said reflecting element is formed of a metal plate provided in its respective circular waveguide and lying in a plane parallel with both a projectional direction of said probe and an axial direction of said circular waveguide.

* * * * *